No. 610,819. Patented Sept. 13, 1898.
S. G. & W. J. MOONEY.
APPARATUS FOR APPLYING STAY WIRES TO WIRE FENCING.
(Application filed June 3, 1897.)
(No Model.) 2 Sheets—Sheet 1.
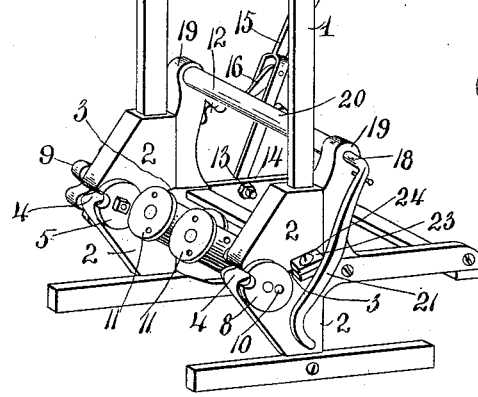
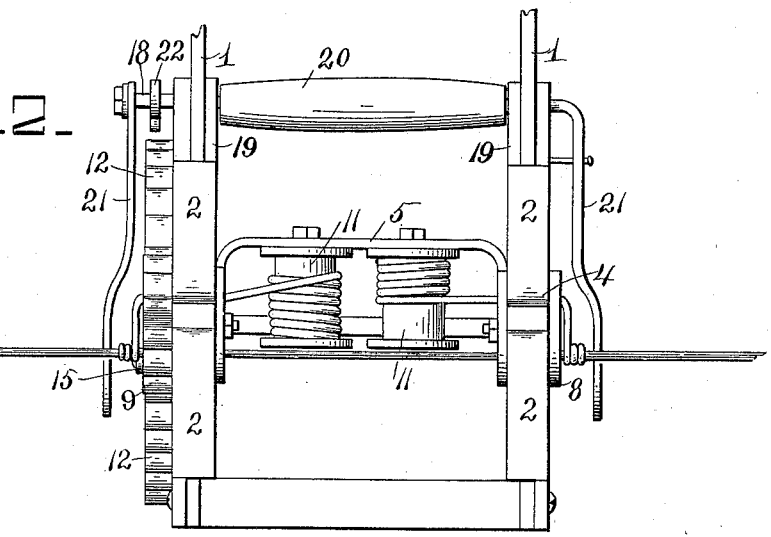

No. 610,819. Patented Sept. 13, 1898.
S. G. & W. J. MOONEY.
APPARATUS FOR APPLYING STAY WIRES TO WIRE FENCING.
(Application filed June 3, 1897.)
(No Model.) 2 Sheets—Sheet 2.
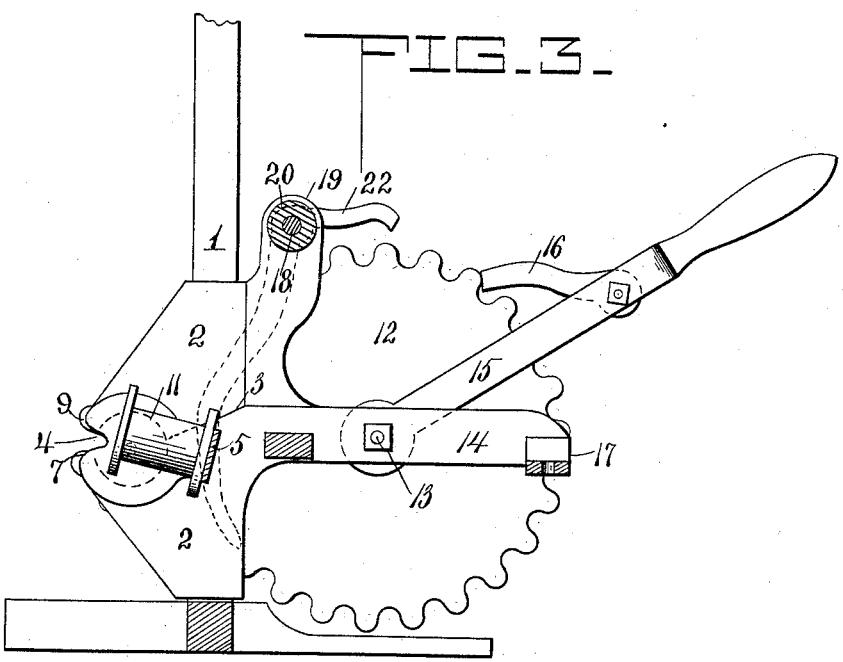
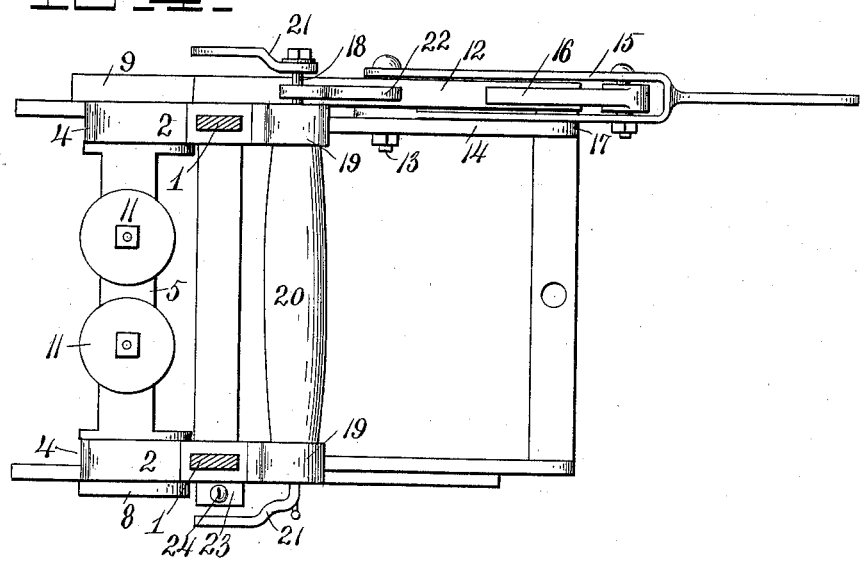
Witnesses
W. E. Allen
Victor J. Evans
Inventors
Sherman G. Mooney,
William J. Mooney,
By John Wedderburn. Attorney
THE NORRIS PETERS CO., PHOTO-LITHO., WASHINGTON, D. C.

UNITED STATES PATENT OFFICE.

SHERMAN G. MOONEY AND WILLIAM J. MOONEY, OF PATTONSBURG, MISSOURI.

APPARATUS FOR APPLYING STAY-WIRES TO WIRE FENCING.

SPECIFICATION forming part of Letters Patent No. 610,819, dated September 13, 1898.

Application filed June 3, 1897. Serial No. 639,291. (No model.)

*To all whom it may concern:*

Be it known that we, SHERMAN G. MOONEY and WILLIAM J. MOONEY, of Pattonsburg, in the county of Daviess and State of Missouri, have invented certain new and useful Improvements in Apparatus for Applying Stay-Wires to Wire Fencing; and we do hereby declare the following to be a full, clear, and exact description of the invention, such as will enable others skilled in the art to which it appertains to make and use the same.

The invention relates to an apparatus for applying stay or cross wires and weaving them upon the longitudinal wires of a fence, the object being to apply the stay-wires to longitudinal wires that have been previously stretched upon and secured to the fence-posts by wrapping said stay-wires upon the longitudinal wires at each intersection of the said stay-wires therewith.

It consists in a construction and arrangement of the parts of the apparatus or machine whereby the above object is attained in a simple and effective manner by means adapted for use by the farmer or others without the aid of an expert in wire-weaving and will be understood from the following description and claims, reference being had to the accompanying drawings, in which—

Figure 1 is a perspective view of the machine or apparatus; Fig. 2, a front elevation of the same, showing a section of the fence-wires with the apparatus in operative relation thereto; Fig. 3, a longitudinal section through the apparatus; Fig. 4, a plan view of the same, and Fig. 5 a perspective view of the spool-winding lever detached. Fig. 6 represents a horizontal section through the shuttle and the stay-wire spools thereon.

1 indicates the upright frame, made preferably in the inverted-U shape, or, rather, with its cross-bar in right-angled relation to the upright frame-bars 1 1, which are made preferably solid and in one piece with the upper transverse bar thereof. The lower ends of these uprights are secured to a suitable transverse beam, which at its ends is secured to longitudinal bars, forming a suitable support for the upright frame 1.

2 2 indicate blocks perforated or mortised vertically and adapted to slide upon the upright frame-bars 1, said blocks forming bearings for the transversely-arranged shaft carrying the wire-weaving journals. The blocks 2 are divided, preferably, longitudinally at points indicated at 3, the line of separation between the upper and lower parts of the blocks being inclined, as shown, for adapting the said parts to be separated for the introduction of the journals of the shuttle-shaft 5, which is made in the crank form shown, intermediate of its journals, which rest in bearings in the block 2. The journals 6 are fast on the arms of the crank-axle portion, the bearing for the journals 6 being slotted at 4, preferably at the point of junction of the divided portions of the bearing-blocks, to permit the passage between them of the longitudinal fence-wires, and the journals 6 are slotted upon one side to receive the said longitudinal wires. The ends of the crank-arms of the axle are made substantially in disk form, as indicated, and are also slotted for the reception of the longitudinal fence-wires in line with the slots 7 in the shaft-journals. The outer ends of the journals are provided one with a disk 8 and the other with a pinion 9, which serve, in connection with the disk ends of the crank-axle, to prevent longitudinal movement of the journals in their bearings in the block 2. On the opposite side of the center of the journals 6 from that provided with the slot or groove 7 the journals are provided with longitudinal perforations 10, through which wires pass from spools 11 11, mounted on suitable journals secured to the crank portion of the axle upon which the wire is wound for forming the stay-rods connecting the longitudinal wires of the fence. These spools are provided with perforations or eyes upon their forward flanges, upon opposite sides of their journals, to receive a crank-arm for operating the spools for unwinding the wires thereon preparatory to the operation of the machine in applying the stay-wires. These spools are arranged at right angles to the journals and upon one side of the slots for receiving the longitudinal fence-wires, so that they may be carried around said longitudinal wires in wrapping the stay-wires thereon. The pinion 9 upon the outer end of one of the journals engages with a spur-gear 12, mounted on a stud-shaft 13, fast on the horizontal arm 14, rigidly secured to the gear-block to move therewith. Upon the shaft 13 is pivoted a bifurcated arm or lever 15, which at or near its outer end carries a pawl 16, adapted to engage with the teeth on the wheel 12 for actuating the latter and with it the pinion 9, fast on the shuttle-shaft 5. The lever 5 at the end of its outward throw rests upon a stop 17, limiting its throw in that direction, its movement in the opposite direction being limited by a transverse shaft 18, mounted in suitable uprights 19, fast on the gear-block, to move therewith.

The shaft 18 is provided intermediate of the uprights with a sleeve or collar 20, which serves to steady the movements of the shaft, said shaft being provided at its ends with curved pendent arms 21, adapted to be thrown forward for removing the longitudinal wires from the grooved journals of the shuttle-shaft and the slots thereof in the journal-bearings after the stay rods or wires have been wound upon the longitudinal fence-wires. The end of the shaft adjacent to the gear-wheel 12 is squared and carries a pawl 22, which as the arms 21 are moved forward to discharge the wires from the slots of the journals and the journal-bearings, as described, is thrown into engagement with the toothed wheel 12 for holding the latter in position until the lever 15, with its pawl, is retracted for engaging again said wheel for operating the same. The journals 6 and the expanded ends or disks on the ends of the crank-arm thereof have also a disk and a pinion on their outer ends, respectively, and the said journals are perforated to permit the passage through them of the wires from the spools 11 11, one upon each side from the spool adjacent thereto, as shown in Fig. 2.

The frame supported upon the bearing-blocks to which the transverse shuttle-shaft is journaled may be of any suitable construction, simply serving to connect the bearing-blocks and to be adjusted therewith as the said blocks are moved up or down on the frame-standards 1. The upper movable portion of the divided bearing-blocks may be provided with pendent ears (indicated at 23) perforated to receive set-screws 24 for holding the upper movable portions of the blocks in engagement with the lower portion thereof, the arrangement being such as to permit the upper portion of the block to be readily removed for permitting the removal of the shuttle journals and shaft from the divided block when required for any purpose.

In operation the frame carrying the shuttle-shaft is moved up or down on the standards 1 until the open slots in the jaws and in the shaft-journals fall into engagement with one of the longitudinal wires of the fence after the ends of the spool-wires have been connected with the upper or lower wire of said fence, as preferred. As soon as the journals are engaged with the longitudinal wires described a rotary movement is imparted to the shuttle-shaft by means of the gear-wheel 12 and the pinion 11, fast upon the said shaft, a quarter of a revolution of the wheel 12 serving to impart an entire revolution to the shuttle-shaft and in so doing to wrap the stay-wires around the longitudinal wires engaged by the shuttle-shaft journals. If more than one wrapping is required, the lever 15 is retracted and another quarter-revolution given to the wheel 12, thereby imparting another revolution to the shuttle-shaft and wrapping the stay-wires once more around the longitudinal wires, and this operation may be repeated for wrapping the stay-wires around the longitudinal wires as many times as may be deemed necessary, after which the shuttle-bearing frame is adjusted up or down on the frame-standards 1 to the next longitudinal wire, according as the direction of the adjustment is determined beforehand, and the stay-wires may be wrapped upon said longitudinal wires, as above described, two stay-wires being wrapped upon the longitudinal wires at each revolution of the shuttle-shaft.

25 indicates a suitable lever-handle for engaging the socketed forward face of the spools for rotating the same and winding from each a supply of wire to be used in the operation of the apparatus.

By the construction described a simple and effective apparatus is provided which is adapted to be used by the farmer or his assistant for readily applying stay-wires to longitudinal fence-wires that have already been stretched upon and secured to posts in any usual manner, thereby obviating the necessity of purchasing a woven-wire fence or of procuring the services of an expert for applying and weaving the stay-wires upon the longitudinal wires of a fence.

In practice the shuttle, including the crank-shaft 5, the slotted journals 6, the slotted and perforated end disks, and pinion 9, are all cast in one piece, thereby greatly reducing the cost of manufacture as compared with forming said parts separate and then securing them to each other and obviating all liability of relative movement or displacement of the parts.

Having thus described the invention, what we claim as new, and desire to secure by Letters Patent, is—

1. In a wire-weaving apparatus, the revoluble shaft made in crank form and provided with slotted journals for the reception of the longitudinal wires and with longitudinal perforations for the stay-wires passing through said journals, in combination with stay-wire spools mounted on separate journals on said shaft substantially as described.

2. In a wire-weaving apparatus, the revoluble shaft or shuttle made in crank form and provided with slotted journals, and spool-spindles secured to the crank portion of said shuttle-shaft at right angles to and upon one side of the center of the axis of said shaft, substantially as described.

3. In a wire-weaving apparatus, the revoluble shaft or shuttle made in crank form and provided with slotted journals, the crank portions intermediate of said journals carrying stay-wire spools, and means for rotating said shaft, substantially as described.

4. In a wire-weaving apparatus, the revoluble shaft or shuttle made in crank form and provided with slotted and perforated journals, spool-spindles secured to the crank portion of said shaft intermediate of said journals and at one side thereof, slotted bearings for said journals, a pinion fast on one journal, and means for actuating said pinion and shaft, substantially as described.

5. The combination in a wire-fence-weaving machine or apparatus, of the upright frame, the revoluble shaft journaled in divided bearings adjustable on said frame, said shaft journals and bearings being slotted to receive the longitudinal fence-wires, a pinion fast on one of said journals, a gear-wheel engaging said pinion, and a lever for actuating said gear-wheel, substantially as described.

6. A shuttle-shaft having slotted journals for engaging the longitudinal fence-wires and longitudinal perforations for the passage of stay-wires on opposite sides of the journal centers from the longitudinal wires, means for actuating said shaft, and pivoted arms for removing the longitudinal wires from the slotted shuttle-shaft journals, substantially as described.

7. The combination in a wire-fence-weaving machine, of a crank-axle provided with slotted and perforated journals for receiving the longitudinal and stay wires, stay-wire spools mounted on the crank portion of the said shuttle-shaft, a pinion fast on one journal of said shaft, a gear-wheel and lever for actuating said pinion, the arms for removing the longitudinal wires from the slots in said journals, and a pawl connected therewith for engaging the pinion-actuating gear-wheel and holding the same while the lever actuating said wheel is being retracted, substantially as described.

In testimony whereof we have signed this specification in the presence of two subscribing witnesses.

SHERMAN G. MOONEY.
WILLIAM J. MOONEY.

Witnesses:
R. BEALS,
W. H. H. SHRECKENJAUST.